(12) United States Patent
Julien et al.

(10) Patent No.: US 8,549,216 B2
(45) Date of Patent: Oct. 1, 2013

(54) MEMORY MANAGEMENT USING PACKET SEGMENTING AND FORWARDING

(75) Inventors: Martin Julien, Laval (CA); Robert Brunner, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 199 days.

(21) Appl. No.: 12/816,850

(22) Filed: Jun. 16, 2010

(65) Prior Publication Data
US 2011/0173369 A1 Jul. 14, 2011

Related U.S. Application Data

(63) Continuation-in-part of application No. 12/726,216, filed on Mar. 17, 2010, now Pat. No. 8,208,484.

(60) Provisional application No. 61/293,882, filed on Jan. 11, 2010.

(51) Int. Cl.
*G06F 12/00* (2006.01)
(52) U.S. Cl.
USPC ............................ 711/104; 711/147; 711/108
(58) Field of Classification Search
USPC .......................................... 711/108, 104, 147
See application file for complete search history.

(56) References Cited

U.S. PATENT DOCUMENTS

| | | | |
|---|---|---|---|
| 6,470,021 B1 | 10/2002 | Daines et al. | |
| 6,542,977 B1 | 4/2003 | Andersen | |
| 6,965,603 B1 | 11/2005 | Parruck et al. | |
| 7,296,112 B1 * | 11/2007 | Yarlagadda et al. | 711/105 |
| 7,650,459 B2 * | 1/2010 | Eilert et al. | 711/103 |
| 7,693,142 B2 | 4/2010 | Beshai | |
| 7,979,665 B1 * | 7/2011 | Todd et al. | 711/202 |
| 2006/0023719 A1 | 2/2006 | Sindhu et al. | |
| 2008/0126507 A1 | 5/2008 | Wilkinson | |
| 2009/0116490 A1 | 5/2009 | Charpentier et al. | |
| 2009/0172318 A1 | 7/2009 | Sugai et al. | |
| 2009/0187696 A1 | 7/2009 | Roos et al. | |

FOREIGN PATENT DOCUMENTS

| | | |
|---|---|---|
| EP | 0889668 A2 | 1/1999 |
| WO | 2007/144215 A1 | 12/2007 |

OTHER PUBLICATIONS

PCT Search Report from corresponding application PCT/IB2011/050102.

Norbert Venet et al., Multi-Gigabit Optical Interconnects for Next-Generation On-Board Digital Equipment, Proceedings of the 3rd International Conference on Space Optics (ICSO 2004), Mar. 30-Apr. 2, 2004, pp. 581-587.

* cited by examiner

*Primary Examiner* — Kalpit Parikh
(74) *Attorney, Agent, or Firm* — Alex Nicolaescu, Ericsson Canada Inc.

(57) ABSTRACT

Systems, devices and methods according to these exemplary embodiments provide for memory management techniques and systems for storing data. Data is segmented for storage in memory. According to one exemplary embodiment, each fragment is routed via a different memory bank and forwarded until they reach a destination memory bank wherein the fragments are reassembled for storage. According to another exemplary embodiment, data is segmented and stored serially in memory banks.

8 Claims, 8 Drawing Sheets

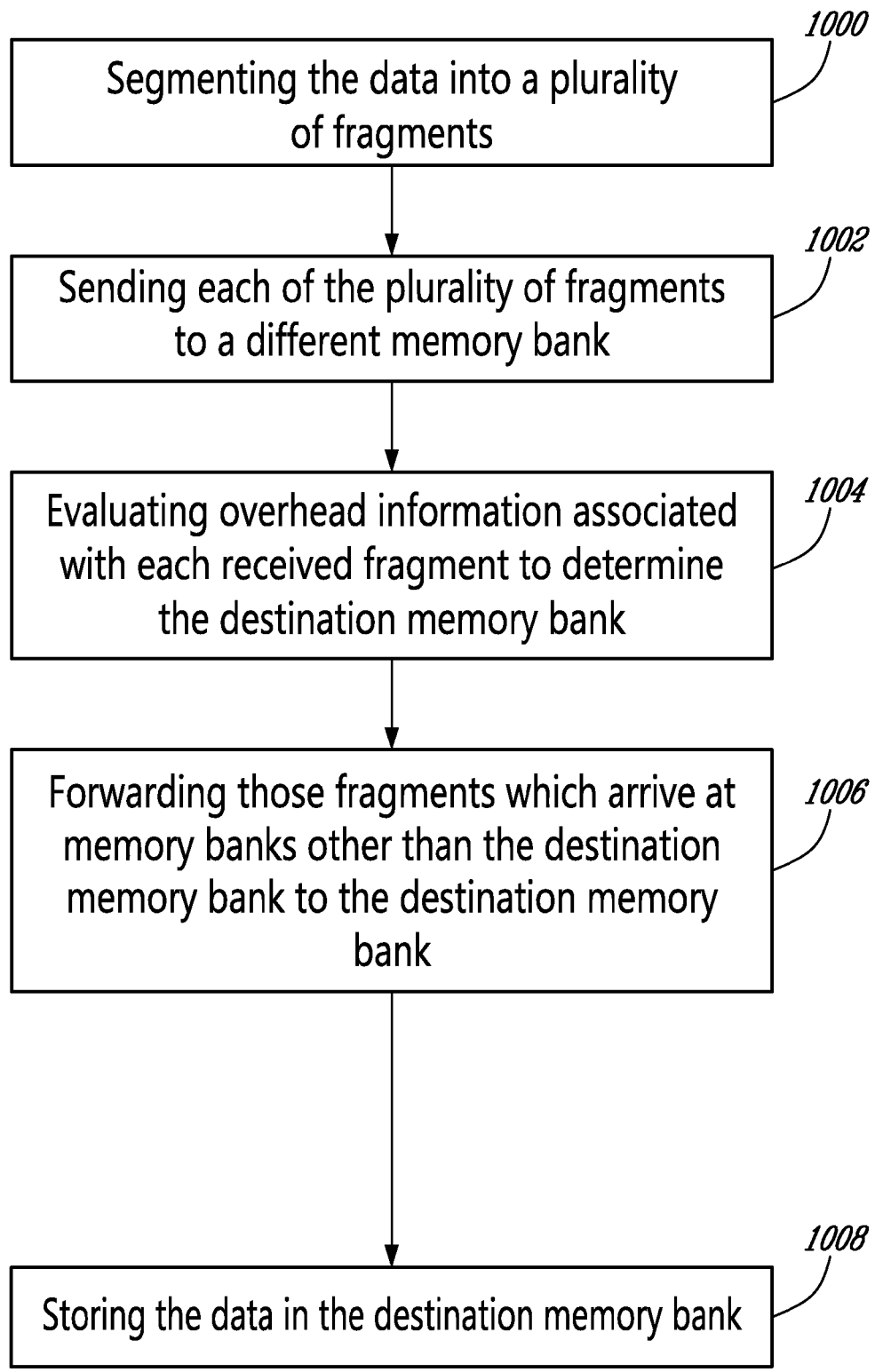

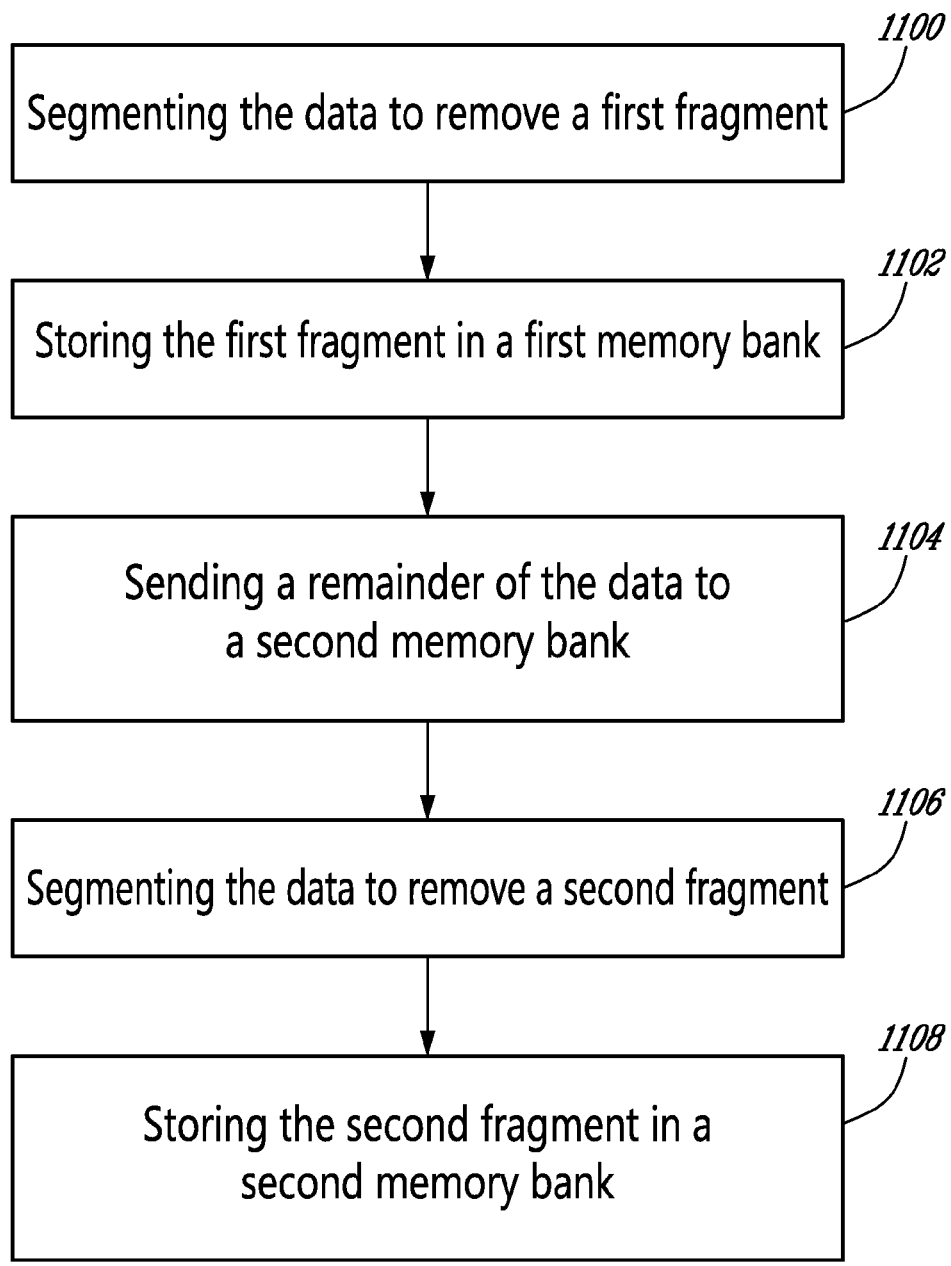

MEMORY MANAGEMENT USING PACKET SEGMENTING AND FORWARDING

RELATED APPLICATIONS

This non-provisional patent application is related to, and claims priority based upon, prior U.S. provisional patent application entitled "SCALABLE FABRIC BY DISTRIBUTED FRAGMENT FORWARDING (DFF) VIA AN OPTICAL MESH", application No. 61/293,882, filed Jan. 11, 2010, in the names of Laurent Marchand and Robert Brunner. This non-provisional patent application is a continuation in part of prior U.S. patent application Ser. No. 12/726,216, entitled "FORWARDING A PACKET WITHIN A ROUTER USING FRAGMENTS OVER AN INTERCONNECT", filed on Mar. 17, 2010, in the names of Laurent Marchand and Robert Brunner. The disclosures of these two applications are expressly incorporated here by reference.

TECHNICAL FIELD

The present invention relates generally to data processing systems and in particular to methods, devices and systems for managing memory devices used in such systems.

BACKGROUND

As system architecture designs for network infrastructure applications (and other applications) tend to become more modular in order to optimize component re-usability and to achieve better scalability, efforts are also being made to identify logical components which represent the most fundamental system resources. Those basic system resources can be represented by logical components, where their interactions characterize a particular system architecture design. As systems benefit from offering a system design optimized for the required performance, flexibility also should be considered.

In a system architecture design, several basic logical components can be identified, such as: memory, processing elements, switching elements, etc. Regarding memory devices, it is desirable to improve the memory resources in scalable system architecture designs, leveraging mainly access to and availability of the memory.

Typically, system architecture designs require dedicated memory banks for each processing element. One potential improvement to the dedicated memory solution is to make memory banks available to several different processing elements, which technique is commonly called shared memory. In shared memory implementations, the memory accesses are typically managed by memory controllers, which are responsible for coordinating the different requests for memory access. Memory banks are managed through a memory manager, which manages the memory resources.

While shared memory can improve the memory resources, and potentially better sized for their intended use in terms of design, shared memory implementations still limit the maximum memory access for each processing element. Thus increasing the memory access in existing data processing systems typically requires the provision of new types of memory banks which are capable of handling the higher amount of memory access. Moreover, while conventional memory devices require a memory manager for allocating memory resources, such dedicated or shared memory normally limits its access to physical processing components which are located on the same physical, printed circuit board as the memory.

Accordingly, it would be desirable to provide other memory devices, systems and management techniques which improve memory usage.

SUMMARY

Systems, devices and methods according to these exemplary embodiments provide for memory management techniques and systems for storing data. Data is segmented for storage in memory. According to one exemplary embodiment, each fragment is routed via a different memory bank and forwarded until they reach a destination memory bank wherein the fragments are reassembled for storage. According to another exemplary embodiment, data is segmented and stored serially in memory banks. Moreover, according to exemplary embodiments, data stored in memory is accessed using a key, which key can be mapped to a unique location in a memory bank. The writer or reader of the data is thus only required to provide the key in order to store or retrieve the data from the memory. The key can be based on a unique field or built from several fields. In other words, the key could be a unique value, it could represent a class of data and a value, or it could be built dynamically from several fields provided in the protocol header.

According to one exemplary embodiment, a method for writing data to a destination memory bank includes the steps of segmenting the data into a plurality of fragments, sending each of the plurality of fragments to a different memory bank, evaluating overhead information associated with each received fragment to determine the destination memory bank, forwarding those fragments which arrive at memory banks other than the destination memory bank to the destination memory bank, and storing the plurality of fragments in the destination memory bank.

According to another exemplary embodiment, a method for writing data to a plurality of memory banks includes the steps of segmenting the data to remove a first fragment, storing the first fragment in a first memory bank, sending a remainder of the data to a second memory bank, segmenting the data to remove a second fragment, and storing the second fragment in a second memory bank.

According to yet another exemplary embodiment, a memory control system includes a first segmentation and reassembly (SAR) logic configured to receive data for writing to memory and to segment the data into a plurality of fragments, and a plurality of memory banks, each having SAR logic associated therewith and also each having fragment forwarding engine (FFE) logic associated therewith, wherein the first SAR logic is further configured to send each of the plurality of fragments to a different one of the plurality of memory banks, wherein the FFE logic associated with each of the plurality of memory banks is configured to evaluate overhead information associated with a received fragment to determine whether the associated memory bank is a destination memory bank associated with the received fragment and, if not, to forward the received fragment to the destination memory bank, and wherein the SAR logic associated with the destination memory bank stores the plurality of fragments in the destination memory bank.

According to still another exemplary embodiment, a memory control system includes a first logic configured to receive data for writing to memory and to segment the data to remove a first fragment, a first memory bank configured to receive and store the first fragment, wherein the first logic is further configured to forward a remainder of the data to a second memory bank, and a second logic, associated with the second memory bank, configured to receive the remainder of the data and to segment the remainder of the data to remove a second fragment, the second memory bank configured to receive and store the second fragment.

The SAR and/or FFE functions described above may, for example, physically be provided in memory controllers disposed proximate the memory bank which they serve or may be integrated into the memory bank itself.

BRIEF DESCRIPTION OF THE DRAWINGS

The accompanying drawings illustrate exemplary embodiments, wherein:

FIGS. 10 and 11 are flowcharts illustrating methods according to exemplary embodiments.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, memory access can be improved by increasing the amount of memory access available from, for example, the perspective of an application. Other exemplary embodiments provide simplified storage and retrieval and an increased memory usage density. Additionally, exemplary embodiments enable memory resources to become a system resource that can be shared between all the processing elements within a system using an internal network for memory access.

To provide context for some of the solutions described herein according to exemplary embodiments, it may first be useful to more fully discuss issues with memory access associated with existing memory management techniques. A distributed system architecture design typically requires an internal network infrastructure. Such an internal network infrastructure can be minimally characterized by, for example, its topology, the number of network nodes connected, and its maximum memory access. The maximum memory access is typically associated with the memory access which is available between a processing element and its memory bank, as shown conceptually in FIG. 1 wherein the memory access between a processing element 100 and its corresponding memory bank 102 is, for example, 30 Gbps. In this case, processing speed of the element 100 will, at least in some cases, be limited by the memory access of the memory bank 102.

Figure 1:
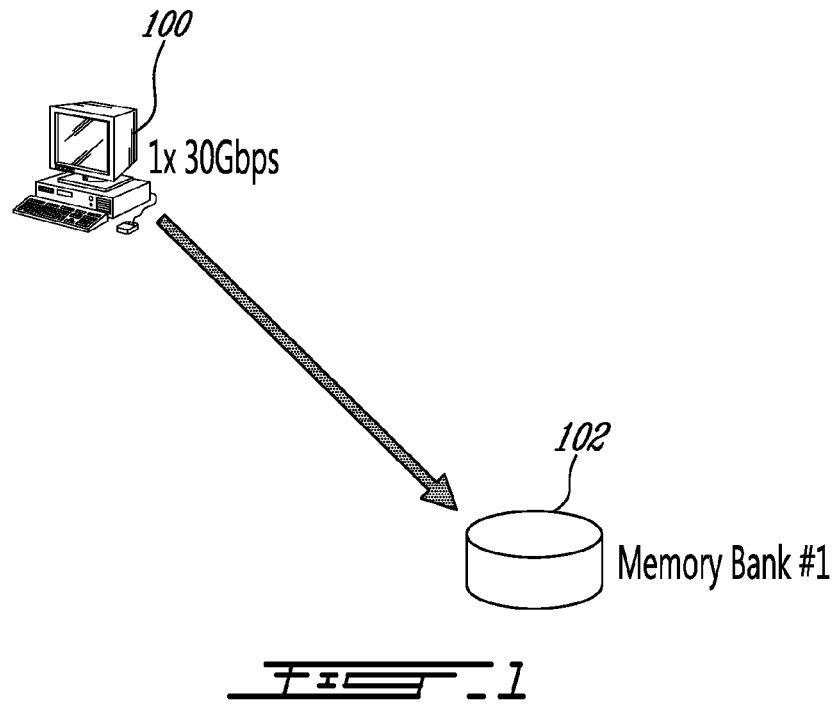
FIG. 1 depicts memory access limitations associated with individual memory banks.
Figure 2:
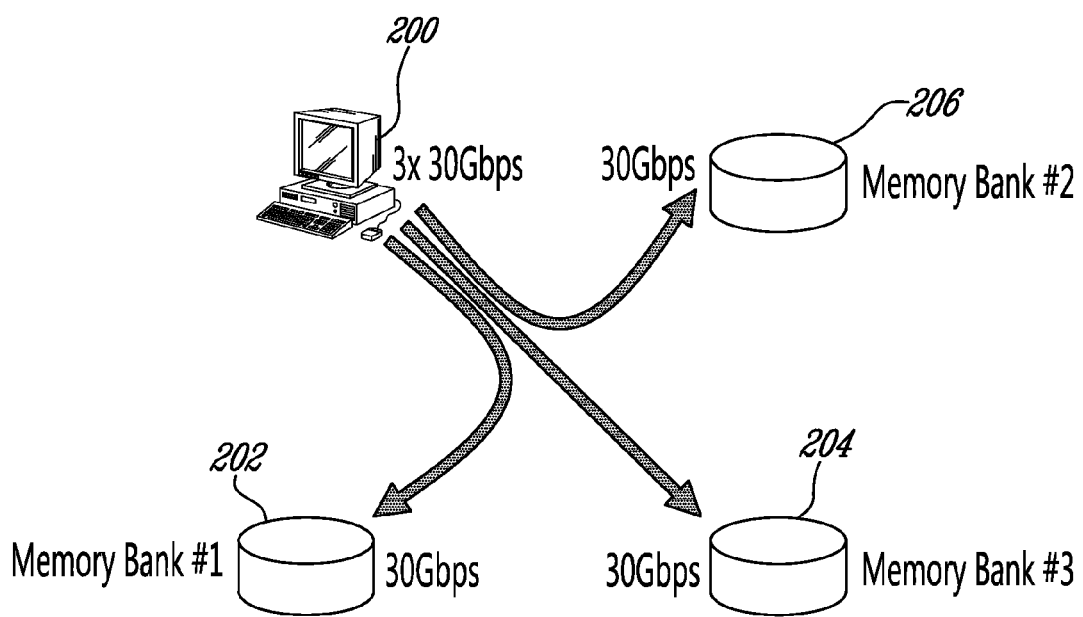
FIG. 2 shows a processing element connected to three memory banks.

One possible solution to this problem is to increase the memory access available to a processing element by having access to several independent memory banks, each of them being accessed in parallel at the maximum speed supported by each memory bank. For example, as shown in FIG. 2, the memory access available to the processing element 200 is 3×30 Gbps, while each individual memory bank 202, 204 and 206 is limited to a memory access of 30 Gbps. By using the memory access for each memory bank 202, 204 and 206 for each access to the memory (i.e., each read or write to memory), processing unit 200 can avail itself of 90 Gbps instead of 30 Gbps as in the internal network infrastructure of FIG. 1. Alternatively, the same 30 Gbps could be provided more cheaply to processing unit 200 using the parallel arrangement of FIG. 2, but with each memory bank 202, 204 and 206 having an individual memory access of 10 Gbps.

Figure 3:
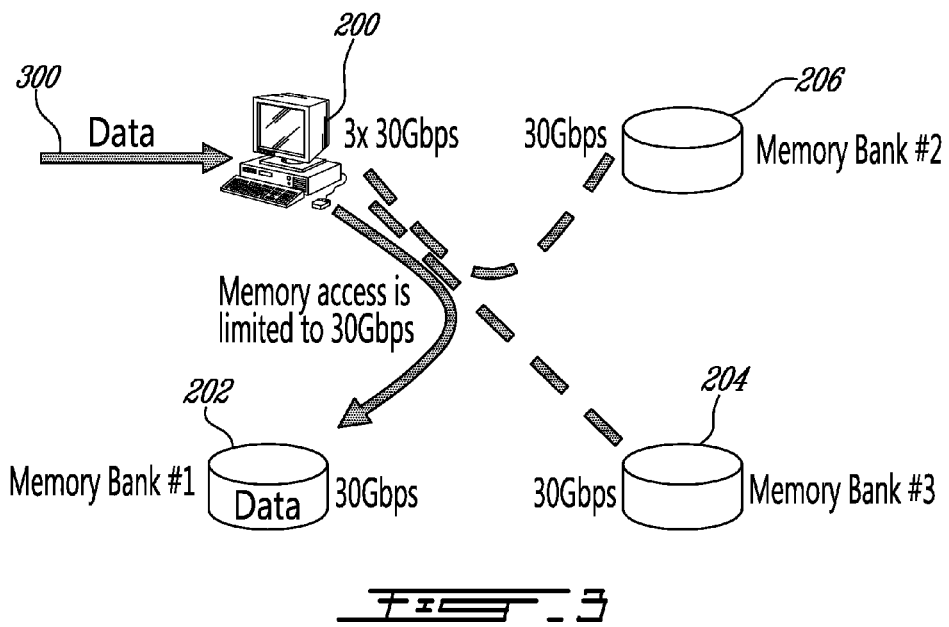
FIG. 3 illustrates a memory transaction associated with the system of FIG. 2.

While having access to several memory banks allows a processing element 200 to access more memory capacity, the internal network infrastructure will still need to manage efficiently the total amount of memory available via a central memory manager (not shown). In fact, having access to a higher memory access to the memory does not necessarily make the data that is requested optimized for the available memory access. In other words, as shown in FIG. 3, if the data 300 that is requested is only stored in memory bank 202, then the memory access available through the other available memory banks 204, 206 cannot normally be used by processing element 200. This means that the data accesses would still be limited by the memory access supported by each memory bank itself, e.g. 30 Gbps in this example, even though multiple memory banks 202, 204 and 206 are each connected to processing element 200.

Thus, in order to benefit from the total amount of memory available and the total amount of memory access, two primary functions are provided to memory management architectures according to these exemplary embodiments: a Segmentation and Reassembly (SAR) function and a Fragment Forwarding Engine (FFE) function. Generally, as used herein, the SAR function refers to the process used to fragment and reassemble data stored in memory banks. According to exemplary embodiments, each time data needs to be stored in memory, the data is first segmented into fragments. The fragments are distributed among the different memory banks, which in turn can use their FFE function to redirect memory access requests to the final memory bank destination. In this way, the processing element can use all of the available channels or lanes associated with the connected memory banks to store each data word in memory.

Figure 4:
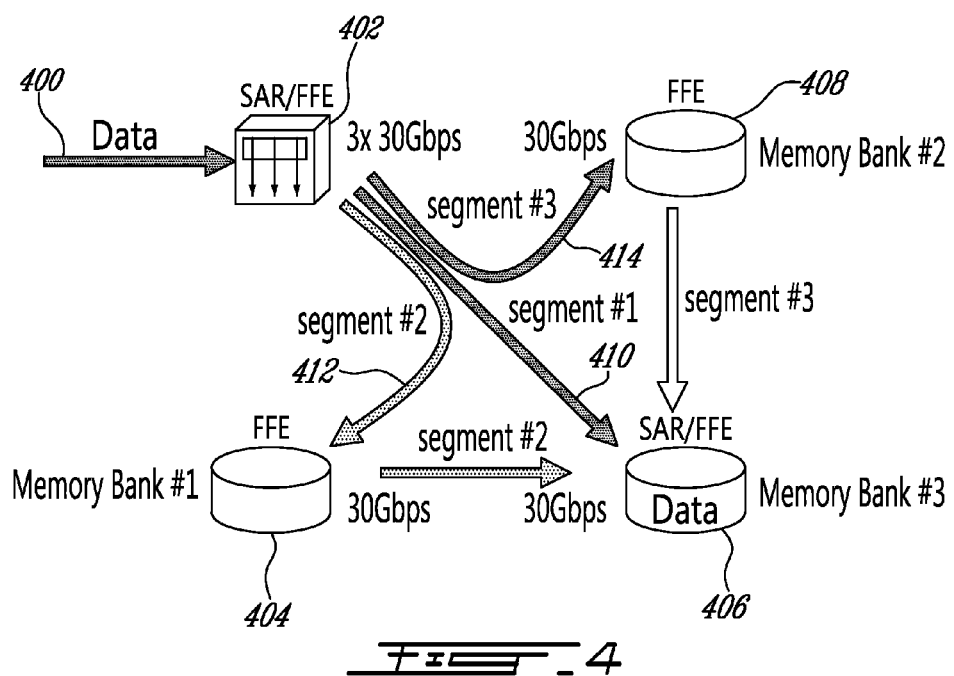
FIG. 4 depicts a write transaction using segmentation and forwarding according to an exemplary embodiment.

FIG. 4 shows an example where data needs to be written to memory by a processing element according to an exemplary embodiment. Therein, the data 400 is first segmented into fragments by the SAR portion of a SAR/FFE function 402, which then uses its collocated FFE function to send the different fragments among the available memory banks 404, 406 and 408 in order to take advantage of the total available memory access from the available memory banks 404, 406 and 408. For example, as shown in FIG. 1, the SAR can segment a data word to be stored into three segments. Then, a first segment of the data word can be transmitted to memory bank 406 via a first physical lane 410 on a interconnect, a second segment of the data word can be transmitted to memory bank 404 on a second physical lane 412 and a third segment of a data word can be transmitted to memory bank 408 via a third physical lane 414.

As will be described in more detail below, and as part of the segmentation process, each segment (memory write request) contains information about the one of the plurality of memory banks which is selected as the ultimate destination for the entire data word to be stored in memory, i.e., in this example memory bank 406. The destination memory bank can, for example, be identified by the processing element (not shown in FIG. 4) which originated the memory write request. Then, those other memory banks which receive fragments of the data word for which they are not the ultimate storage destination, e.g., memory banks 404 and 408 in the example of FIG. 4, use their own FFE function to forward their fragments to the destination memory bank 406. Since the originating processing element had selected the memory bank 406 for the storage of the data word, the SAR function associated with the memory bank 406 will reassemble the received fragments in order to ensure the integrity of the data word, before storing that data word in a storage location within that memory bank.

Figure 5:
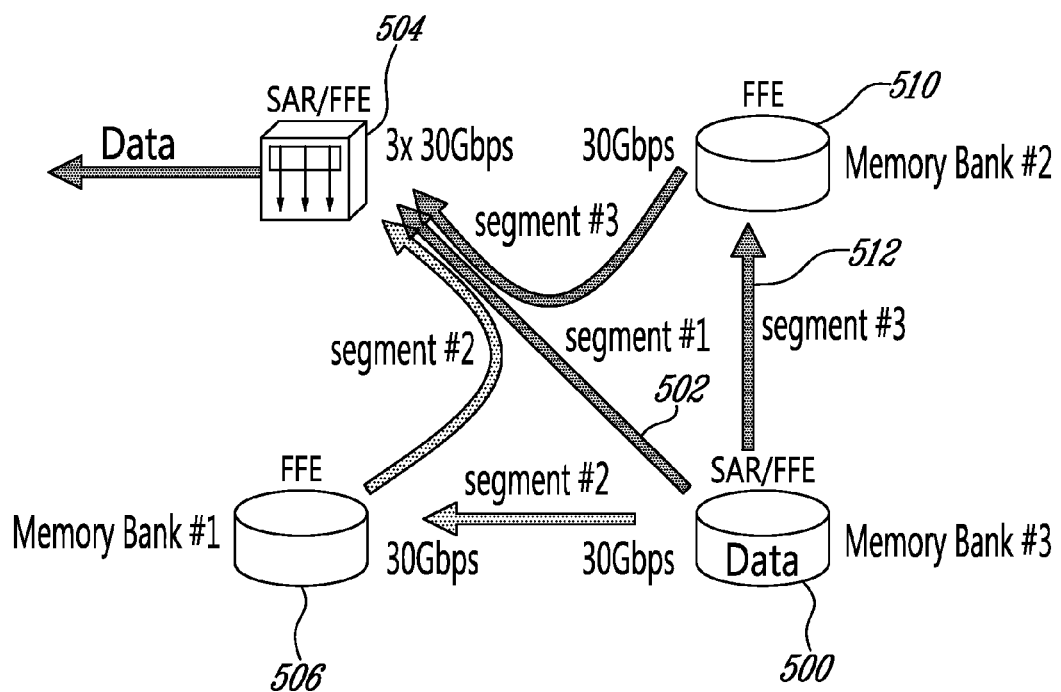
FIG. 5 depicts a read transaction using segmentation and forwarding according to an exemplary embodiment.

For read access from a memory array according to exemplary embodiments, the memory access request can first be sent to the memory bank where the data is stored. Then, the same procedure as the one described above for write access can be applied, except in the reverse direction. An example is shown in FIG. 5, wherein the requested data word to be read from memory is first segmented by the SAR function resident at memory bank 500 into a number of fragments which is, for example, equal to the number of available lanes or channels on which to send data. Alternatively, a subset of the available lanes could be used, in which case an algorithm (e.g., a round robin or weighted distribution algorithm) could be used to distribute the plurality of fragments associated with a chunk of data among the available lanes. Then, a first segment of the data word can be transmitted toward a SAR/FFE function 504, e.g., associated with a processing element, on a first physical lane 502 on a interconnect, a second segment of the data word can be transmitted to memory bank 506 on a second physical lane 508 and a third segment of a data word can be transmitted to memory bank 510 via a third physical lane 512. The overhead or encapsulation portions of the segments which arrive at memory banks 506 and 510 are evaluated by the FFE function resident at those banks and then forwarded on to SAR/FFE 504. SAR/FFE 504 reassembles the three segments and then outputs the complete data word toward the requesting processing element (not shown).

The exemplary embodiments described above use SAR and FFE functions to, among other things, segment data words or packets into smaller fragments and forward those fragments toward destination devices, e.g., other memory banks. The SAR and/or FFE functions described above may, for example, physically be provided in memory controllers disposed relatively close to the memory bank which they serve or may be integrated into the memory bank itself. To facilitate understanding of such functions according to exemplary embodiments, a detailed example of both an SAR function and an FFE function are provided below. However it should be appreciated by those skilled in the art that the specific implementation of the SAR and/or FFE function may vary depending upon, for example, various aspects of the system architecture in which memory management techniques according to these exemplary embodiments are implemented.

Thus, as a purely illustrative example, consider that the format of a data fragment which is exchanged on an interconnect between the memory banks, may include the following fields (not necessarily in the order presented):

SOF—Start of Fragment Indicator bit
EOF—End of Fragment Indicator bit
DA—Destination Address
Flow Indicator 1—SA Queue State (Satisfied/Hungry/Starving)
SA—Source Address
Flow Indicator 2—TA Queue State
TA—Transit Address (Indirect Path)
SN—Sequence Number
KID—Key (or data) Identification
Payload Fragment (Fixed or Variable Length)
BIP/CRC—Bit Interleaved Parity or Checksum A fragment, as that term is used herein, refers to a segmented piece or chunk of a larger data word, which data word or packet has a size that is designed for storage as a complete and addressable unit of data in a memory bank. The KID field above can be used, by itself or in conjunction with one or more other fields, to uniquely identify one or more particular memory contents within one or more memory banks. A fuller discussion of exemplary addressing schemes associated with the exemplary embodiments is provided below.

Figure 6:
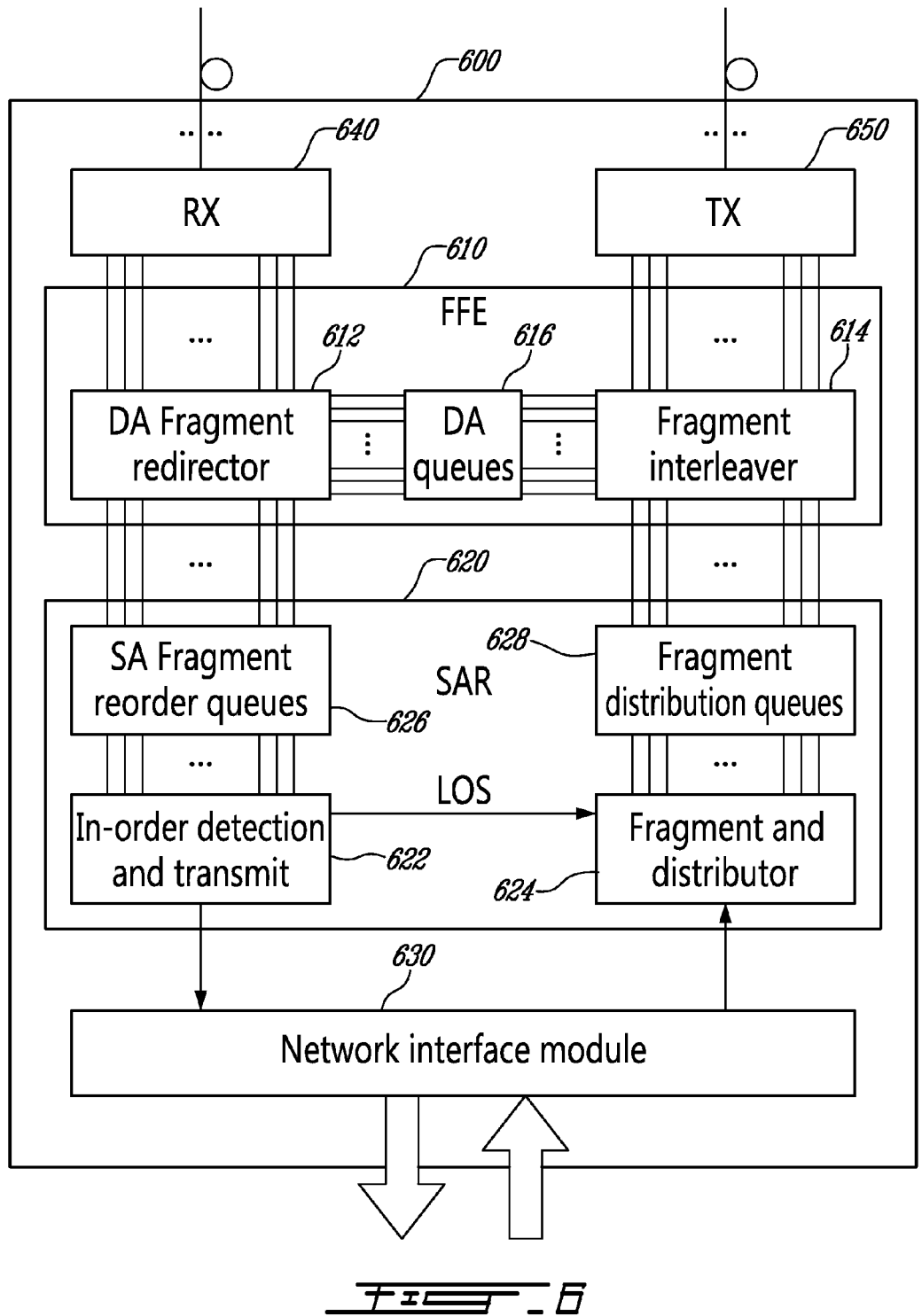
FIG. 6 shows exemplary SAR/FFE logic according to an exemplary embodiment.

FIG. 6 shows an exemplary implementation of a combined SAR/FFE function in accordance with this exemplary embodiment which can, for example, generate and/or forward such a fragment. The exemplary SAR/FFE function 600 includes an FFE module 610 and SAR module 620. According to this exemplary embodiment, the FFE module 610 includes a DA Fragment Redirector module 612, a Fragment Interleaver module 614 and a DA Queues module 616. The SAR module 620 includes an In-Order Detection and Transmit module 622, a Fragment and Distributor module 624, an SA Fragment Reorder Queues module 629 and a Fragment Distribution Queues module 628. The SAR/FFE function 600 also includes a network interface module 630, which is used to interact with other network nodes, e.g., other memory banks than the one with which the SAR/FFE 600 is associated.

When a yet to be fragmented data packet is received by the network interface module 630, that fragment can be processed by the transmit (TX) chain on the right hand side of FIG. 6. Thus, the fragment is received from the network interface module 630 by the Fragment-Distributor module 624 in SAR function 620. The packet is segmented into fragments, and each fragment is encapsulated, for instance, into the exemplary frame format as exemplified hereinabove. The flow indicator #1 field is populated with the state of the "SA Fragment Queue (#DA)", while flow indicator #2 is populated with the state of the "Bounced Fragment Queue (#DA)". The TA field is populated with a memory bank identifier (e.g., memory bank number) which will transit the fragment, while the SN field can be used as a serial sequence to facilitate in the reassembly of the fragments by the addressed memory bank. The algorithm for allocating TA's according to exemplary embodiments can be a round robin scheme or a weighted distribution scheme. If used, the weighted distribution scheme allocates more fragments to 0 hop paths (i.e. DA=TA) and reduces the quantity of bounced fragments in a system. All fragments with the same TA are directed to the Fragment Distribution Queue module 628, which are to be transmitted to memory bank #TA via a dedicated channel (e.g., wavelength if an optical mesh is used as the interconnect between memory banks or lane if a physical wired (electrical) interconnect is employed).

The Fragment Interleaver module 614 multiplexes fragments that are targeted for the same memory bank between the DA Queues module 616 that contains bounced fragments and Fragment Distribution Queues module 628 using, for instance, a 50-50 duty cycle. The multiplexed fragments are thereafter sent towards the TX module 650, which forwards them via the interconnect to the addressed memory bank.

Turning now to the receive side (left hand side of FIG. 6), the DA Fragment Redirector module 612 receives fragments from the interconnect via the RX module 640, e.g., fragments which are forwarded to the memory bank associated with SAR/FFE 600 from other memory banks. Those fragments which have a DA value indicating that they are addressed to "self" are directed to the SA Fragment Reorder Queues module 626. Fragments whose DA values indicate that they are not addressed not to "self" are redirected to the DA Queues (or Bounced Fragments) module 616, which are then queued based on a common DA. The SA Fragment Reorder Queues module 626 sorts fragments addressed to "self" based on the SA value. The SA value may be used to sequence the fragments in order.

The fragments in the SA Fragment Reorder Queues module 626 will be delimited by an SOP & EOP indicator, as described above with respect to the exemplary fragment format. The recognition of these bits by the SA Fragment Reorder Queues module 626 indicates that it has a complete packet that can be tagged as "ready" for transmission. The In-Order Detection & Transmit module 622 can then empty the corresponding queues from the SA Fragment Reorder Queues module 626 using, for instance, a round robin procedure.

In the event of a Loss of Signal (LOS) or break in connection to a neighboring memory bank detected by the Fragment and Distributor module 624, a scheduler, for instance in the Fragment Interleaver 614 or the In-Order Detection and Transmit module 622, may skip sending fragments and/or packets to the DA/TA bound memory bank.

The memory resources of the SA Fragment Reorder Queues module 626 may experience congestion at the destination DA. To avoid losing data at the destination DA, a message may thus be returned to the sender to rate limit the source SA, specifically for data flows towards the destination DA. Congestion management may be activated, which may involve, for instance, exchanging states of receiving queues in reverse direction traffic. This could be done, for instance, by continually exchanging "SA Queue State" bits (not shown) between the In-order Detection and Transmit module 622 and the Fragment and Distributor module 624. Examples of different states exchanged include: starving (underflow condition), hungry (normal condition), and satisfied (approaching overflow condition). A credit based methodology may also optionally be used to tally the severity of a state (e.g. if 100 SATISFIED messages are received from the source SA in succession, it can be concluded that "loss" is eminent if no action is taken). If no reverse direction traffic is available, as in the case of unidirectional traffic, then the destination DA may intermittently send a plain header without any payload towards the source SA to trigger the state exchange.

In the example of FIG. 6, the blade SAR/FFE function 600 does not explicitly show memory modules or hardware structures. However those skilled in the art will readily recognize that the various queue modules (e.g., 612, 614, 616, 626, and 628) of FIG. 6 comprise an underlying modification of some memory content to at least temporarily store fragments and/or packets.

Previous exemplary embodiments describe, for example, memory management techniques wherein data packets are segmented into fragments and the fragments are forwarded in parallel toward an end destination memory bank. Among other things, such embodiments leverage the SAR function to help increase the total memory access, i.e., from a speed perspective. However, it may also be advantageous to increase the total memory capacity transparently by using chained SAR functions in conjunction with memory management according to other exemplary embodiments.

Figure 7:
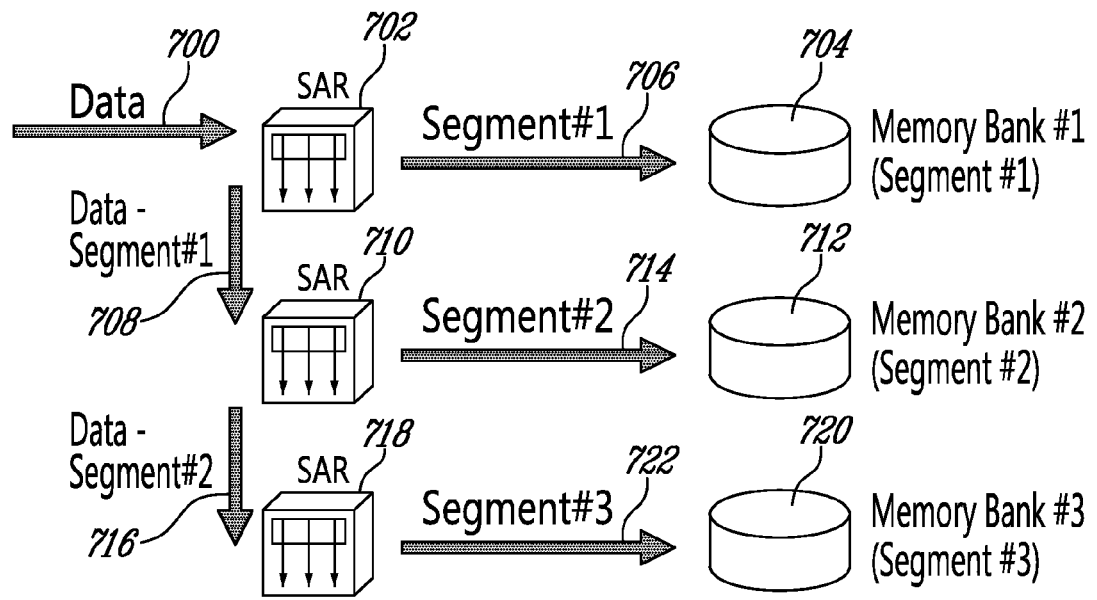
FIG. 7 depicts a write transaction using segmentation and forwarding according to another exemplary embodiment.

An exemplary chained segmented memory data storage process according to such exemplary embodiments is illustrated in FIG. 7. Therein, a processing element (not shown) sends its request to store data 700 to a memory controller including a SAR function 702 that is responsible for the memory bank 704 which it handles. The SAR function 702 removes a first fragment 706 from the data packet and the first memory bank 704 stores the first fragment 706 (referred to as a segment in the Figure) of the data 700. The remainder 708 of the data 700 is sent to another memory controller having its own SAR function 710 associated with a second memory bank 712. In turn, the second SAR 710 segments the data again, storing only the second segment 714 in its own memory bank 712, while forwarding the rest of the data 716 toward a third SAR 718 and memory bank 720 combination, which then stores a third segment 722. Although three SAR functions/memory banks are shown in FIG. 7, those skilled in the art will realize that this process can continue through additional (or fewer) SAR/memory bank combinations until the complete data word is written to memory. Among other advantages, this provides for an improved memory accesses or greater capacity.

There are several use cases where data might need to be replicated in several different memory banks. In order to handle those use cases, an additional mirroring function could be used to provide such a feature. There are several different places in the system architecture design where the mirroring function could be inserted, depending on the implementation design requirements. For example, in the case where a memory bank would need a backup or a copy, then the mirroring function could be used to make sure that the data stored in the selected memory bank is replicated in one or many other memory banks. Such a function could also be quite useful in the case where data might need to be migrated between different memory banks, typically required in the case of In-Service Software Upgrade (ISSU), or by functions related to energy efficiency considerations.

Even though use cases such as ISSU can benefit from the mirroring function described above, another important function may also be useful—a segment forwarding function. A segment forwarding function is basically a function that could be used to forward the memory data requests to the memory bank to another memory bank. Some logic may be needed to enable forwarding the memory data requests. For example, in the case where ISSU is requested on the system, a memory bank might need to be migrated to another memory bank. In such a case, while the content of the memory bank is being migrated to another memory bank, accesses to the memory data should be carefully managed. While it would be preferable for write accesses to be performed on the new memory bank, it would also be preferable for read accesses to be performed on the new memory bank first, and then on the old memory bank if the memory data access was not yet completed.

Another function which could be useful in segmented memory management according to various exemplary embodiments is a segment or fragment locator. Such a segment locator may also be provided in exemplary embodiments to allow random access to a specific subset of the complete data stored in memory. Typically, it might not be necessary to retrieve the whole data word when only part of it is required and the word is stored in fragments as described above. In order to perform retrieval of one or more fragments, the segment locator function would be responsible for identifying the exact location of the requested fragments. Assuming that system-wide processing elements might request data from the original memory bank being migrated, the SAR function available to processing elements also require some kind of function that could be used to find the proper location for the segments of a particular information data. In the case of ISSU, the segment locator function could be used to identify the new memory bank, while the segment forwarding function could be used to get or store the latest memory data segment requested.

Today, memory banks are made available to the different processing elements locally located on the same physical board, but it is not yet possible to consider that memory resource as being commonly available for the entire system. Considering that system architecture designs need to be more flexible to quickly adapt to the required features and/or traffic models, there is a need to more loosely couple the different logical components of a system, e.g., the memory resources. Based on the concepts described above related to accessing different banks of memory in parallel using SAR to optimize the memory access, exemplary embodiments provide for a system which offers increased memory access. However, in a system where the different resources benefit from being considered system-wide resources, there would be advantages to specifying the memory banks as such.

In a system where all of the different memory banks are possibly located on different physical boards which are accessible to all the processing elements, the complete system could benefit from the total system memory capacity. In such a scenario, the different processing elements would need to have access to an internal network within the system, giving them access to the different memory bank resources.

Traditional memory banks require an addressing scheme that is normally based on a physical memory location. In order to manage efficiently the allocation of memory locations by the processing element, a memory manager is required. While such a memory manager fits well in a scheme where the different processing elements accessing the memory banks are commonly sharing the same memory manager, it becomes quickly inefficient when the processing elements are distributed all over the system.

Figure 8:
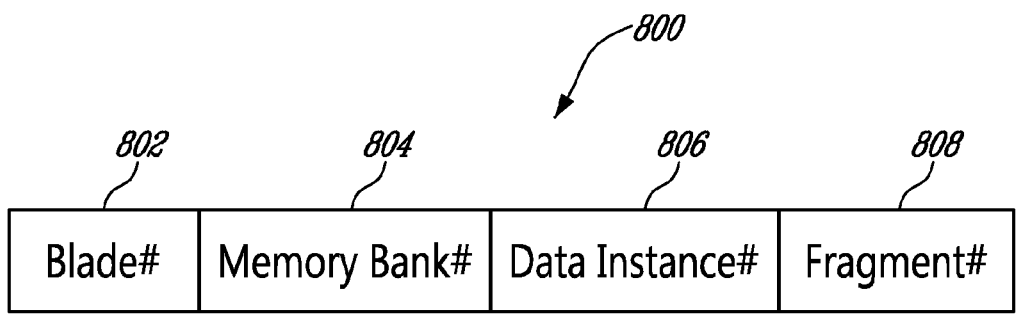
FIG. 8 show an exemplary content addressable memory format according to an exemplary embodiment.

In order to avoid requiring a complex memory manager for managing the complete system memory, it would be much simpler to use an addressing scheme based on the concept of content-addressable memory. That concept basically grants access to memory based on a key instead of memory location. For example, each of the processing elements could potentially write in memory using an addressing scheme that would make sure that no possible collision could occur in terms of memory location in a specific memory bank. Such a memory addressing scheme could be based on the modularity a particular system architecture design offers. For example, the addressing scheme shown in FIG. 8 can be used in conjunction with the foregoing exemplary embodiments (e.g., operating as the destination address format for a fragment). Therein, the address format 800 could include a blade number field 802, memory bank number field 804, a data instance number field 806 and a fragment number field 808. Those skilled in the art will appreciate that other content-addressable memory formats could be used in conjunction with the segment-based memory management techniques described herein.

Thus, according to some exemplary embodiments, the data fragments are provided with specific header information. This specific header information can be used to efficiently store and retrieve the data to/from its memory bank destination. The specific header information can also be used to handle congestion, forwarding, data re-assembly and to locate the data in the memory bank. Thus, according to exemplary embodiments, data stored in memory is accessed using a key, which key can be mapped to a unique location in a memory bank. The writer or reader of the data is thus only required to provide the key in order to store or retrieve the data from the memory. The key can be based on a unique field or built from several fields. In other words, the key could be a unique value, it could represent a class of data and a value, or it could be built dynamically from several fields provided in the protocol header.

Using concepts described herein, it further becomes possible to consider memory resources as a system resource available to all processing elements within the system. In the context where several processing elements might have to process the same data for different purposes, it could be more efficient to share the same data copy instead of different copies for each processing element. Typically, a single copy of the data could be written to memory, while all the processing elements that need access to it would simply share a reference to the same memory data.

For example, in the case of a network infrastructure application such as a router, each time a packet is received, it could be automatically written to memory. Typically, the processing required for forwarding the packet will be executed by several different processing elements, one after the other. In that particular case, a single copy of the packet would be shared. No specific copy per processing element would be required, only a reference to the memory data would suffice.

Figure 9:
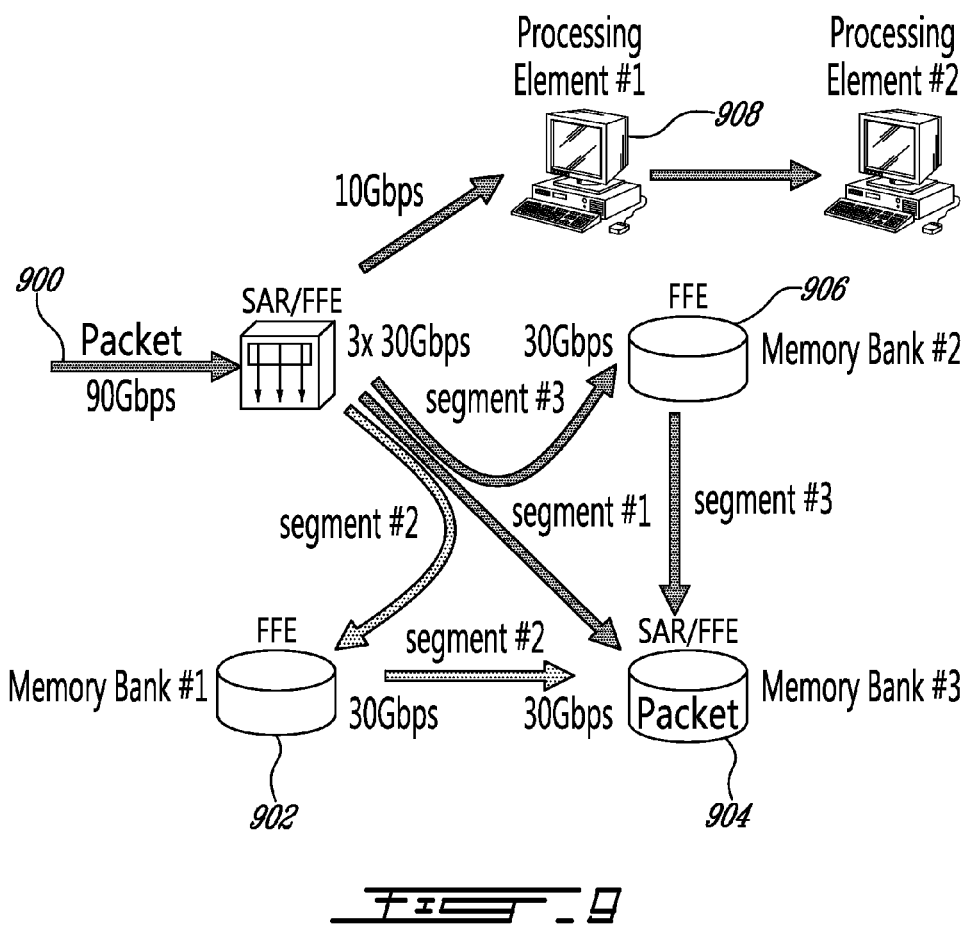
FIG. 9 depicts a system having reduced data copies according to an exemplary embodiment.

For example, as shown in FIG. 9, a packet 900 is received and stored in the memory, including the banks 902, 904 and 906 in the manner described above with respect to FIG. 4. Assuming that the memory access of the media port is considerably larger than the memory access available on the processing element #1 908, e.g., 30 Gbps vs. 10 Gbps in the example of FIG. 9, only part of the packet data should be sent to the processing element 908 itself. In order to do so, the packet received could be stored in memory, while for example only the first 256 bytes would be sent to the processing element #1 908, along with some additional information such as a reference to the packet in memory. There might be several use cases that would not need more than the first 256 bytes for processing the packet, in which case the memory access of the system is improved and the processing element itself becomes more limited by the number of packets per second rather than by its capability to handle large memory access. In fact, the processing power of a processing element does not necessarily match easily the memory access it can provide.

From the foregoing discussion, it will be appreciated that memory access according to exemplary embodiments is not limited by the maximum memory access of a particular type of an individual memory bank. Based, for example, on the concepts of SAR and FFE, improvements for memory access can be reached by making the memory access used by a processing element the sum of the memory access of each individual memory bank. Alternatively, a chained segmentation implementation can be provided which increases the total memory density. Also, memory resources according to exemplary embodiments can become a system resource that can be shared between all the processing elements within a system using an internal network for memory access.

While memory access normally requires a centralized memory manager, using a CAM addressing scheme according to these exemplary embodiments, there is no need for such a complex and centralized function. The memory access requests can be handled independently of any other processing element's requests. Moreover, using the concepts described in this specification, it becomes possible to suggest a system architecture design that would tend to minimize the number of data copies required in order to process the data properly. The zero-copy memory concept basically takes advantage of the fact that, in the case of a router application, each packet received would be stored in memory, somewhere on the system. Assuming that the packet needs to be treated only based on the first 256 bytes, only those bytes, along with some minimal information, would be required to be sent to the processing element. In turn, if this processing element needs to forward again that packet to another processing element, the memory access used to forward the packet would simply be based on a portion of the packet, not the whole packet.

Thus, according to one exemplary embodiment, a method for writing data to a destination memory bank can include the steps illustrated in the flowchart of FIG. 10. Therein, at step 1000, the data is segmented into a plurality of fragments. Each of the plurality of fragments is sent to a different memory bank (step 1002), where their overhead information is evaluated to determine the destination memory bank at step 1004. Those fragments which arrive at memory banks other than the destination memory bank are forwarded to the destination memory bank at step 1006. The data is then stored in the destination memory bank at step 1010.

According to another exemplary embodiment, a method for storing data in a plurality of memory banks includes the steps illustrated in the flowchart of FIG. 11. Therein, at step 1100, the data is segmented to remove a first fragment. The first fragment is stored in a first memory bank at step 1102, and the remainder of the data is sent to a second memory bank at step 1104. The data is segmented at step 1106 to remove a second fragment, and the second fragment is stored in a second memory bank at step 1108. This process can be repeated until all of the data is stored in fragments in memory banks.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for increasing the speed of writing data to a destination memory bank employing a content addressable memory addresses scheme comprising:
    segmenting said data into a plurality of portions for use as payloads for a plurality of fragments;
    adding overhead information to said payloads to form the plurality of fragments, said overhead information including a common destination address for said plurality of fragments;
    sending each of said plurality of fragments to at least one of the plurality of memory banks;
    evaluating, at each one of said plurality of memory banks, said overhead information associated with each one of said plurality of fragments received to determine said destination memory bank;
    forwarding each one of said plurality of fragments which arrive at memory banks other than said destination memory bank to said destination memory bank;
    reassembling, at said destination memory bank, the payloads of said plurality of fragments into said data; and
    storing said data in said destination memory bank;
    wherein said content addressable memory address scheme defines said destination address of said plurality of fragments based on a content addressable memory address uniquely identifying said data.

2. The method of claim 1, wherein said content addressable memory address scheme further defines said common destination address of said plurality of fragments based on a blade number, a memory bank number, data instance number and a fragment number.

3. The method of claim 1, wherein said step of forwarding further comprises:
    queuing received fragments arrived at memory banks other that said destination memory bank based on their destination addresses.

4. A memory control system employing a content addressable memory addresses scheme comprising:
    a first segmentation and reassembly (SAR) logic configured to receive data for writing to memory, to segment said data into a plurality of portions for use as payloads for a plurality of fragments and to encapsulate said payloads with overhead information to form the plurality of fragments, said overhead information including a common destination address for said plurality of fragments; and
    a plurality of memory banks, each having SAR logic associated therewith and also each having fragment forwarding engine (FFE) logic associated therewith;
    wherein said first SAR logic is further configured to send each of said plurality of fragments to at least one of the plurality of memory banks;
    wherein said FFE logic associated with each of said plurality of memory banks is configured to evaluate said overhead information associated with each one of said plurality of fragments received to determine whether the associated memory bank is a destination memory bank associated with the received fragment and, if not, to forward said received fragment to said destination memory bank;
    wherein said SAR logic associated with said destination memory bank stores said plurality of fragments in said destination memory bank; and
    wherein said content addressable memory address scheme defines said address of said fragment based on a content addressable memory address uniquely identifying said data.

5. The system of claim 4, wherein said content addressable memory address scheme further defines said address of said fragment based on a blade number, a memory bank number, data instance number and a fragment number.

6. The system of claim 4, wherein said FFE logic further comprises:
    a plurality of queues for queuing received fragments, which are not addressed to the memory bank associated with said FFE logic, based on their destination addresses.

7. The system of claim 4, wherein said SAR logic and said FFE logic are one of:
    integrated with said plurality of memory banks or disposed within a memory controller associated with each of said plurality of memory banks.

8. The system of claim 4, wherein said SAR logic associated with said destination memory bank reassembles said plurality of fragments into said data prior to storing said plurality of fragments in said destination memory.

* * * * *